United States Patent [19]

Flaming

[11] Patent Number: 4,869,745
[45] Date of Patent: Sep. 26, 1989

[54] APPARATUS FOR FORMING MICROPIPETTE OF CONTROLLED CONFIGURATION BY MOVING THE POINT OF HEAT APPLICATION

[76] Inventor: Dale G. Flaming, 2165-G Francisco Blvd., San Rafael, Calif. 94901

[21] Appl. No.: 342,177

[22] Filed: Apr. 24, 1989

[51] Int. Cl.$^4$ .................. C03B 23/11; C03B 33/06
[52] U.S. Cl. .................................. 65/270; 65/108; 65/271; 65/283; 65/285
[58] Field of Search .............. 65/108, 270, 271, 283, 65/285

[56] References Cited

U.S. PATENT DOCUMENTS

| | | | |
|---|---|---|---|
| 3,249,414 | 5/1966 | Hamilton | 65/271 X |
| 4,045,201 | 8/1977 | Caffarella et al. | 65/270 X |
| 4,146,380 | 3/1979 | Caffarella et al. | 65/270 X |
| 4,530,712 | 7/1985 | Kopf | 65/270 |
| 4,578,101 | 3/1986 | Clark et al. | 65/283 X |
| 4,600,424 | 7/1986 | Flaming | 65/108 X |

FOREIGN PATENT DOCUMENTS 629903  11/1927  France .................. 65/283

*Primary Examiner*—Arthur Kellogg
*Attorney, Agent, or Firm*—Melvin R. Stidham

[57] ABSTRACT

The micropipette puller of this invention includes a pair of gripping jaws that pull a length of glass tubing in opposite directions. The source of heat is a laser and a beam is directed into a beam directing means, such as a lens or mirror, to refract or reflect the beam against the glass tubing between the gripping jaws. The mirror or lens may be oscillated at various rates and through selected angles in each direction to move the reflected beam a selected amount and at selected rates along a greater length of the glass tubing.

7 Claims, 1 Drawing Sheet

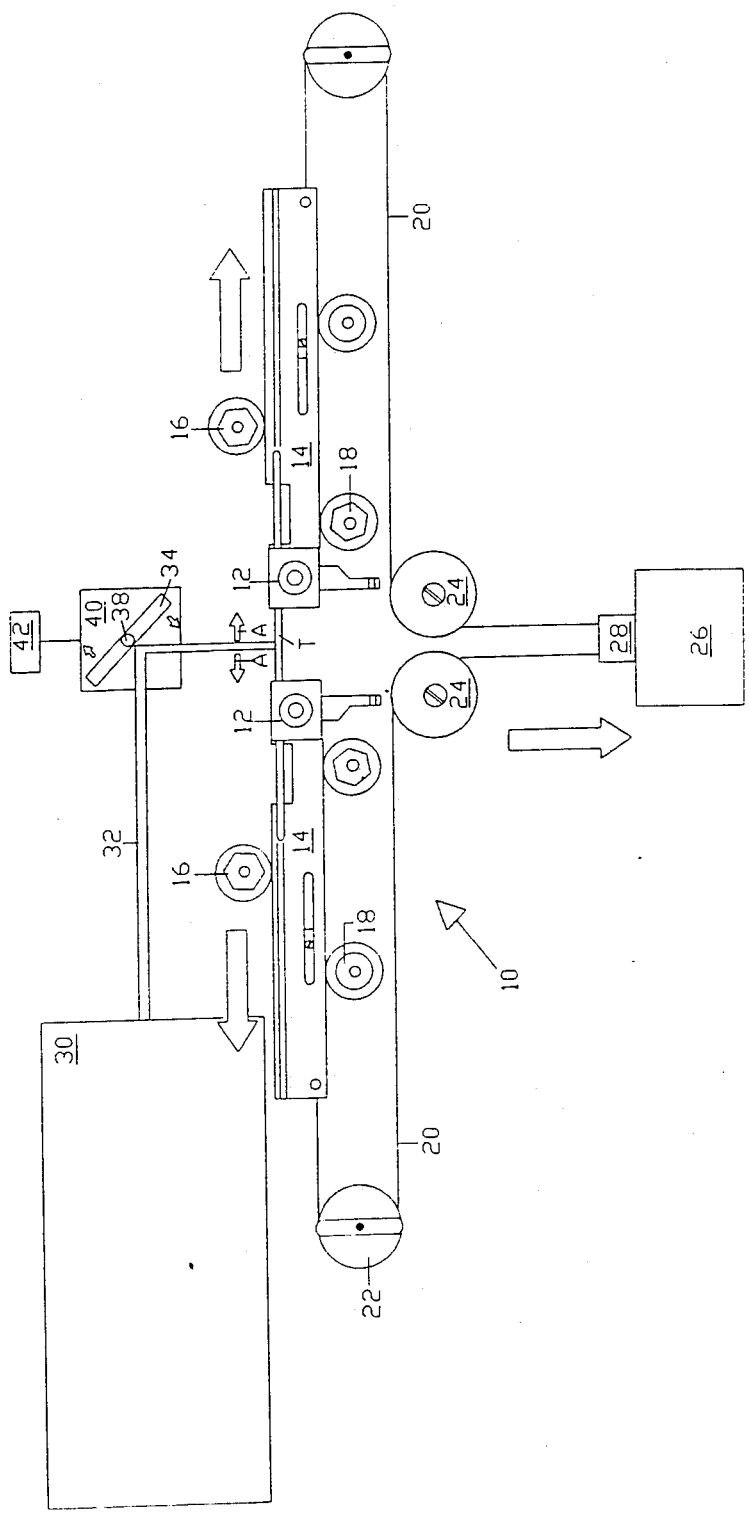

APPARATUS FOR FORMING MICROPIPETTE OF CONTROLLED CONFIGURATION BY MOVING THE POINT OF HEAT APPLICATION

BACKGROUND OF THE INVENTION

This invention relates to micropipette pullers of the type shown in my earlier U.S. Pat. No. 4,600,424 granted July 15, 1986. Micropipette pullers generally employ a filament comprising a heated metal band or wire to heat the glass tubing to its melting point. The shape of the micropipette is dependent largely upon the shape of the filament and various types of filaments are available for the production of different shapes and lengths of micropipettes. For example, a wide filament is generally used to form a long pipette. The shape of the micropipette is also dependent upon the diameter of the annular filament that encircles the glass tubing. A tight fit of the filament around the tubing will result in a sharp heat gradient between the heated and unheated portions of the glass tubing. This will result in an initial fast taper in the glass as it is pulled out and then, as the glass reduces in diameter and contracts away from the filament, the taper becomes more gradual. If a large diameter annular filament is used, the heat gradient will be more gradual and the result is a micropipette with a more uniform taper from shoulder to tip.

The better micropipette pullers are now all computerized so that the variables in the pulling process, such as filament temperature, length of the pull, the strength of the pull and the rate at which the glass is cooled may be programmed into the puller. The only important variable which is not easily changed is the type of heating filament which is being used. Efforts have been made to move the filament during the pulling cycle in order to heat a greater area, but the movement of the filament was slow and very difficult to control in a repeatable manner.

OBJECTS OF THE INVENTION

It is an object of this invention to provide a micropipette puller with means for moving the point at which heat is applied to the glass tubing.

It is a further object of this invention to provide a micropipette puller with means for applying heat to the glass tubing in a controlled and repeatable pattern.

It is a further object of this invention to provide a micropipette puller capable of pulling a micropipette of controlled configuration from materials of high melting point, such as quartz.

Other objects and advantages of this invention will become apparent from the description to follow, particularly when read in conjunction with the accompanying drawing.

SUMMARY OF THE INVENTION

In carrying out this invention, a tubing of glass, quartz or the like is pulled from both ends, initially by a weight carried on the ends of cables and then by a solenoid. A laser directs a laser beam into a mirror, a lens or other means to direct the laser beam against the glass tubing. The mirror or other beam directing means may be oscillated or otherwise moved at a controlled rate and through a predetermined degree of movement to cause the reflected or refracted beam to move along a selected length of the tubing to control the length of the heated tubing.

BRIEF DESCRIPTION OF THE DRAWING

The drawing is a schematic diagram of the apparatus of this invention for pulling a micropipette.

DESCRIPTION OF A PREFERRED EMBODIMENT

Referring now to the drawing with greater particularity, the micropipette puller 10 of this invention includes a pair of gripping jaws 12 on the adjacent ends of puller bars 14. The jaws 12 grip a tubing T of glass, quartz or the like to be pulled into the micropipette as heat is applied to the tubing to melt a portion thereof between the jaws.

The puller bars 14 roll along upper and lower roller bearings 16 and 18 and are pulled by cables 20 which extend over upper cable pulleys 22 and then over closely spaced central lower pulleys 24 to suspend a solenoid 26, which is capable of applying a light pull by application of its own weight, and a stronger pull by actuation of the solenoid plunger 28. The source of heat in the micropipette puller 10 is a laser device 30 that projects a generally horizontal beam 32 into a movable mirror 34, positioned to reflect the beam downward at 34 against the glass tubing T.

While the laser beam 32 is shown as being reflected by a mirror 34, it is to be understood that other means may be employed to direct the beam. For example, the beam 32 could be directed against the tubing T by refraction through a lens or prism or by fiber optics, all within the scope of this invention.

In any event, the beam directing means 34 may be oscillated by any suitable means so that the reflected or refracted beam is moved back and forth longitudinally of the tubing T, as indicated by the arrows A—A to heat a length of the tubing T. For example, the mirror or lense 34 may be oscillated by mounting it on the output shaft 38 of a stepping motor 40. It is also contemplated that the beam may be moved by moving the laser device 30 itself.

The stepping motor may be controlled by a computer 42 to rotate incrementally in either direction and at various rates to achieve different heating patterns applied to the glass tubing, thereby to control the configuration of the taper and the length of the tip. Each signal from the computer 42 may produce a rotational step from the motor 40 of one degree or less so that the increments of movement of the reflected beam 36 may be closely controlled. For example, the computer can control the stepping motor 40 to heat the tubing T uniformally, or it may vary the movement to concentrate heat at the center for more rapid melting at the midpoint. The computer 42 and stepping motor 40 can control the size of the angle through which the mirror or prism 34 oscillates and it can control the rate of oscillation. Moreover, the movement can be programmed for repeated production.

The laser device 30 is not limited by its own melting point as in the case of a filament heater and it can melt materials of high melting point, such as quartz, which resonates at the wave length of a laser beam.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A micropipette puller comprising:
   means for gripping a length of glass tubing at spaced points along the length thereof;
   means for applying a pulling force to separate said gripping means;
   a laser for directing a laser beam;
   a beam directing means disposed to direct said laser beam against said tubing between said spaced points; and
   means for pivoting said beam directing means to cause the directed laser beam to move along the length of said tubing.

2. The micropipette puller defined by claim 1 including:
   means for controlling the rate at which said beam directing means is pivoted.

3. The micropipette puller defined by claim 1 including:
   means for controlling the angle through which said beam directing means is pivoted.

4. The micropipette puller defined by claim 1 wherein:
   said beam directing means is mounted on the output shaft of an incremental rotary drive.

5. The micropipette puller defined by claim 1 wherein:
   said beam directing means is mounted on the output shaft of a bidirectional, incremental drive so that it may be pivoted in both directions and through a selected angle in each direction.

6. The micropipette puller defined by claim 1 wherein:
   said beam directing means is a mirror to reflect said laser beam against said tubing.

7. The micropipette puller defined by claim 1 wherein:
   said beam directing means is a lens to refract said beam against said tubing.

* * * * *